United States Patent
Lahdelma (10) Patent No.: US 10,529,224 B2
(45) Date of Patent: Jan. 7, 2020

(54) ARRANGEMENT FOR DELIVERY OF PRODUCTION CONTROL INFORMATION TO A MINING WORK MACHINE

(71) Applicant: SANDVIK MINING AND CONSTRUCTION OY, Tampere (FI)

(72) Inventor: Ilkka Lahdelma, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 111 days.

(21) Appl. No.: 15/536,142

(22) PCT Filed: Dec. 16, 2014

(86) PCT No.: PCT/EP2014/077933
§ 371 (c)(1),
(2) Date: Jun. 15, 2017

(87) PCT Pub. No.: WO2016/095962
PCT Pub. Date: Jun. 23, 2016

(65) Prior Publication Data
US 2017/0337808 A1 Nov. 23, 2017

(51) Int. Cl.
*G08C 17/02* (2006.01)
*E21B 7/02* (2006.01)
(Continued)

(52) U.S. Cl.
CPC .............. *G08C 17/02* (2013.01); *E21B 7/025* (2013.01); *E21C 37/00* (2013.01); *G05D 1/0276* (2013.01);
(Continued)

(58) Field of Classification Search
None
See application file for complete search history.

(56) References Cited

U.S. PATENT DOCUMENTS

| 2015/0287318 | A1* | 10/2015 | Nair | G08C 17/02 340/5.52 |
| 2017/0199526 | A1* | 7/2017 | McQuillan | G05D 1/0217 |
| 2017/0314331 | A1* | 11/2017 | McCracken | E21B 7/025 |

FOREIGN PATENT DOCUMENTS

EP 2698498 A1 2/2014

OTHER PUBLICATIONS

Zaheer et al., "Considerations for mobile authentication in the Cloud", Information Security Technical Report 16 (2011), p. 123-130 (Year: 2011).*

(Continued)

*Primary Examiner* — Tamara L Weber
(74) *Attorney, Agent, or Firm* — Connie R. Gorski (57) ABSTRACT

A method for providing a mining work machine at a work site with production control information, the method including: assigning, on the basis of overall production management information of the work site, the mining work machine with production control information, defining tasks to be performed by the work machine; downloading the control information to a mobile terminal from one or more downloading points associated with a production management system, the mobile terminal and the one or more downloading points including an application for mutually synchronizing desired control information; providing the mobile terminal in a vicinity of the mining work machine, the mining work machine further having an application for mutually synchronizing desired control information; performing an authentication between the mobile terminal and the mining work machine; selecting the control information to be downloaded to the mining work machine; and downloading the selected control information to the mining work machine wirelessly.

13 Claims, 4 Drawing Sheets

(51) Int. Cl.
    *E21C 37/00*     (2006.01)
    *G05D 1/02*     (2006.01)
    *G08G 1/00*     (2006.01)
    *G05D 1/00*     (2006.01)
    *H04W 12/06*     (2009.01)

(52) U.S. Cl.
    CPC ............. *G08G 1/20* (2013.01); *G05D 1/0088* (2013.01); *G08C 2201/20* (2013.01); *G08C 2201/93* (2013.01); *H04W 12/06* (2013.01)

(56) References Cited

OTHER PUBLICATIONS

Jacko, "Human Computer Interaction Handbook: Fundamentals, Evolving Technologies, and Emerging Applications", (Third Edition 2012), p. 262-266 (Year: 2012).*

Anonymous: Help: Guide to doubleTwist Sync [Win 7/8], Mar. 30, 2014, Retrieved from the Internet: URL:https://web.archive.org/web/20140930045602/https://www.duobletwist.com/help/question/guide-to-doubletwist-sync/[retrieved on Aug. 13, 2015] pp. 2,5,7.

Anonymous: "Five mobile apps for the 21st century miner-Mining Technology", Sep. 9, 2014, Retrieved from the Internet: URL: https://web.archive.org/web/2014092085319/http://www.mining-technology.com/feattures/featurefive-mobile-apps-for-the-21st-century-miner-4349777/retrieved on Aug. 13, 2015] p. 1.

* cited by examiner

ARRANGEMENT FOR DELIVERY OF PRODUCTION CONTROL INFORMATION TO A MINING WORK MACHINE

RELATED APPLICATION DATA

This application is a § 371 National Stage Application of PCT International Application No. PCT/EP2014/077933 filed Dec. 16, 2014.

FIELD OF THE INVENTION

The present invention relates to mining work machines, and more particularly to the delivery of the production control information to a mining work machine.

BACKGROUND OF THE INVENTION

Various mining work machines, such as rock drilling equipment, loading equipment and transport equipment, are provided with a software-based control platforms and user interfaces. The operation of mining work machines at work sites is guided and controlled by production management information supplied by a production management system.

Each mining work site typically has its own production management plan comprising various kind of production management information, such as schedules, work machine allocations, drilling plans, etc. This information is continuously updated as the production at the mining work site proceeds. Therefore, the production control information of a particular mining work machine, i.e. tasks to be carried out by said mining work machine, needs to be continuously updated, e.g. on daily basis.

In many occasions, the production control information is supplied to a particular mining work machine manually. The production control information may be supplied to a particular mining work machine using a public communication network, such as a cellular network and a satellite telephone system. However, public communication networks do not offer a very cost-effective way for providing mining work machines with the production control information. Moreover, taking the mining work machine, e.g. from an underground mine, in connection with a communication network for the updating the production control information may interrupt the operation of the apparatus.

SUMMARY OF THE INVENTION

An improved method and technical equipment implementing the method has now been developed for the delivery of the production control information to a mining work machine. Various aspects of the invention include a method, a computer program product and a mining work machine, which are characterized by what is stated in the independent claims. Various embodiments of the invention are disclosed in the dependent claims.

According to a first aspect, there is provided a method for providing a mining work machine at a work site with production control information, the method comprising: assigning, on the basis of overall production management information of the work site, the mining work machine with a set of production control information, defining tasks to be carried out by the work machine; downloading the control information to a mobile terminal from one or more downloading points associated with a production management system, the mobile terminal and the one or more downloading points comprising an application for mutually synchronizing desired control information; providing the mobile terminal in a vicinity of the mining work machine, the mining work machine further comprising an application for mutually synchronizing desired control information; performing an authentication between the mobile terminal and the mining work machine; selecting, in said application comprised by the mobile terminal, the control information to be downloaded to the mining work machine; and downloading the selected control information to the mining work machine wirelessly.

According to an embodiment, in response to said authentication being successful, the method further comprises synchronizing automatically the selected control information between the mobile terminal and the mining work machine.

According to an embodiment, the method further comprises uploading at least status information of the mining work machine to the mobile terminal and uploading at least said status information of the mining work machine from the mobile terminal via a downloading point to the production management system.

According to an embodiment, said status information comprises positional data of mining work machine during production and production data of the mining work machine, such as drilling hours of the machine on each working site, operating hours for the motors, and number of drilled holes.

According to an embodiment, the control information comprises information for controlling mining operations of the mining work machine.

According to an embodiment, the mining work machine is a rock drilling apparatus and the control information comprises one or more of the following:
   a drilling plan;
   control information for dividing drilling plans among a plurality of rock drilling apparatuses;
   information on a working area for the rock drilling apparatus;
   information on the holes inside the working area.

According to an embodiment, the mining work machine is a transportation vehicle and the control information comprises one or more of the following:
   information for loading or dumping the excavated rock;
   traffic control information for controlling the route of the vehicle in the mine;
   location information of dump sites
   updates of production site environment model, e.g. updating tunnel profile after blast;
   machine configuration parameters set for the shift or task.

According to an embodiment, the control information comprises updates for a control platform of the mining work machine.

According to a second aspect, there is provided a computer program product, stored on a non-transitory memory medium, comprising computer program code for providing a mining work machine with control information, the computer program code which, when executed by a processor, causes an apparatus to perform: download the control information to the apparatus from one or more downloading points comprising an application for mutually synchronizing desired control information; perform, in response to providing the apparatus in a vicinity of the mining work machine comprising the application for mutually synchronizing desired control information, an authentication between the apparatus and the mining work machine; select the control information to be downloaded to the mining work machine; and download the selected control information to the mining work machine wirelessly.

According to a third aspect, there is provided a mining work machine comprising: an application for mutually synchronizing control information assigned to the mining work machine on the basis of overall production management information of the work site, the control information defining tasks to be carried out by the work machine; the mining work machine being arranged to: detect that the mobile terminal is provided in a vicinity of the mining work machine, the mobile terminal further comprising an application for mutually synchronizing desired control information; perform an authentication between the mobile terminal and the mining work machine; and download the control information selected by the mobile terminal to the mining work machine wirelessly.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which.

DESCRIPTION OF EMBODIMENTS

The presently disclosed embodiments are applicable, in particular, to various mining work machines, which is to be broadly understood to cover work machines used in mining and/or construction industry. Particular examples of such work machines include various mobile rock drilling machines and transportation vehicles. A mining work machine may be a mobile mining apparatus, which may be referred to as a mining vehicle, or a stationary mining apparatus. It should also be noted that, in general, a mining work machine may also refer to various machines used for rock excavation in a surface or underground operating area. In this context, the term "rock" is to be understood broadly to cover also a boulder, rock material, crust and other relatively hard material.

Figure 1:
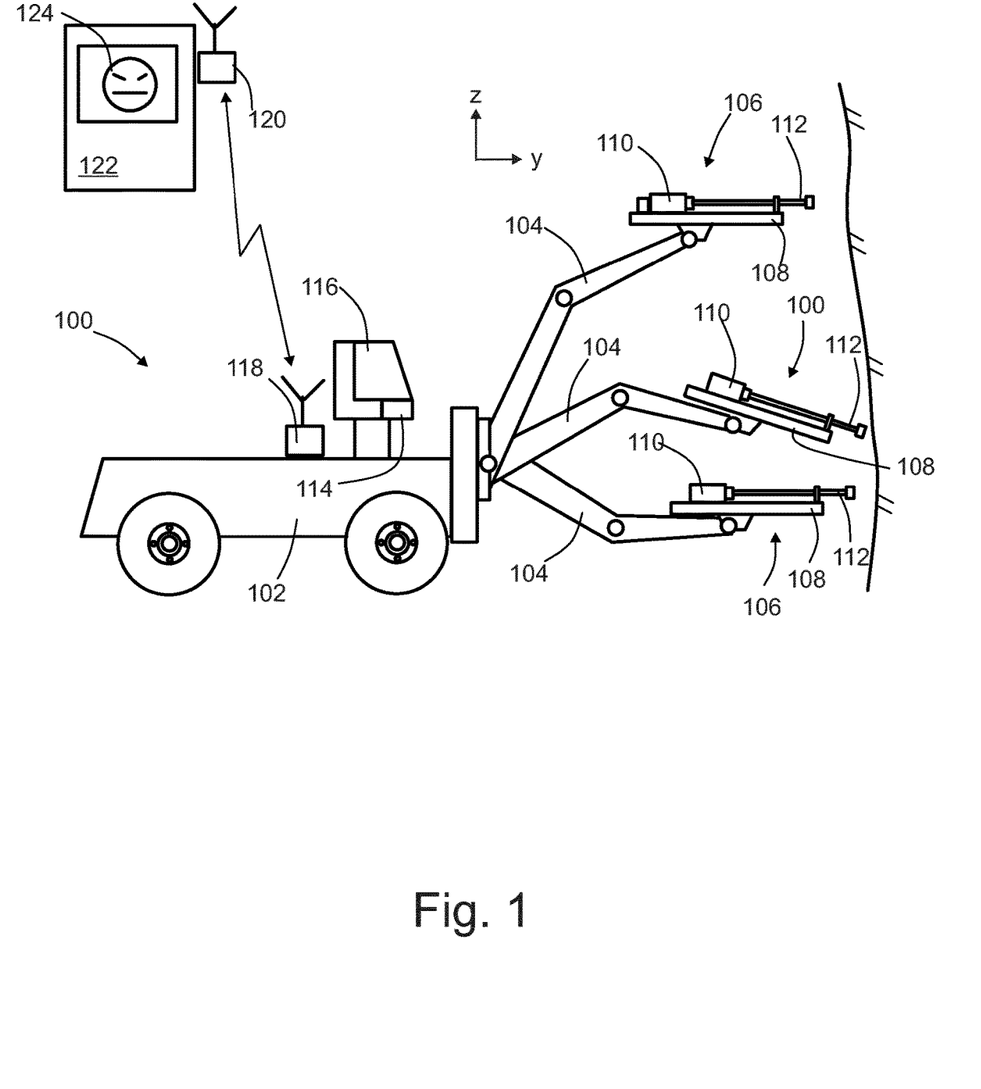
FIG. 1 shows a schematic representation of a rock drilling apparatus as an example of a work machine suitable for implementing the embodiments of the invention.

FIG. 1 shows an example of a rock drilling apparatus 100, such as a rock drilling rig comprising a movable carrier 102, one or more drilling booms 104 and drilling units 106 arranged in the drilling booms 104. The drilling unit 106 comprises a feed beam 108 on which a rock drill 110 can be moved by means of a feed motor (not shown in FIG. 1). Further, the drilling unit 106 comprises a tool 112 with which the impact pulses given by a percussion device (not shown in FIG. 1) of the rock drill 110 are transmitted to the rock to be drilled. The rock drilling apparatus typically comprises a plurality of pumps (not shown in FIG. 1) for generating hydraulic pressure for operating various parts of the apparatus, for pumping drilling fluid for lubricating, cooling, and cleaning a drilling bit, and for pumping rock cuttings from the drill holes.

The rock drilling rig 100 further comprises at least one control unit 114 arranged to control actuators of the rock drilling rig 100, the actuators being arranged in a first control system. The control unit 114 may be a computer or a corresponding device, and it may comprise a user interface with a display device as well as control means for giving commands and information to the control unit 114. The control unit 114 and its user interface are typically located within a cabin 116 of the rock drilling apparatus 100.

Further, the rock drilling apparatus 100 may have a data transfer unit 118, with which the control unit 112 may establish a data transmission connection to a wireless unit. For example, the control unit 112 may establish a data transmission connection to a second control system external to the rock drilling apparatus 100 by utilising a wireless connection provided by a base station 120. The second control system may reside at a control station 122 that may be arranged outside the mine. The control systems may be computers equipped with appropriate software. A remote operator 124 may monitor and control the operations of the rock drilling apparatus 100 via the wireless connection.

FIG. 1 is a simplified figure, and the control system of a mining vehicle, such as the rock drilling apparatus 100, typically comprises several units for implementing different control functions. The control system of the mining vehicle may be a distributed entity consisting of modules connected to a CAN (Controller Area Network) bus, for example, and managing all measurements and controls of the machine. The information system of the control station 122 may also comprise one or more servers, databases, operator workstations and a connection to other networks and systems.

Figure 2:
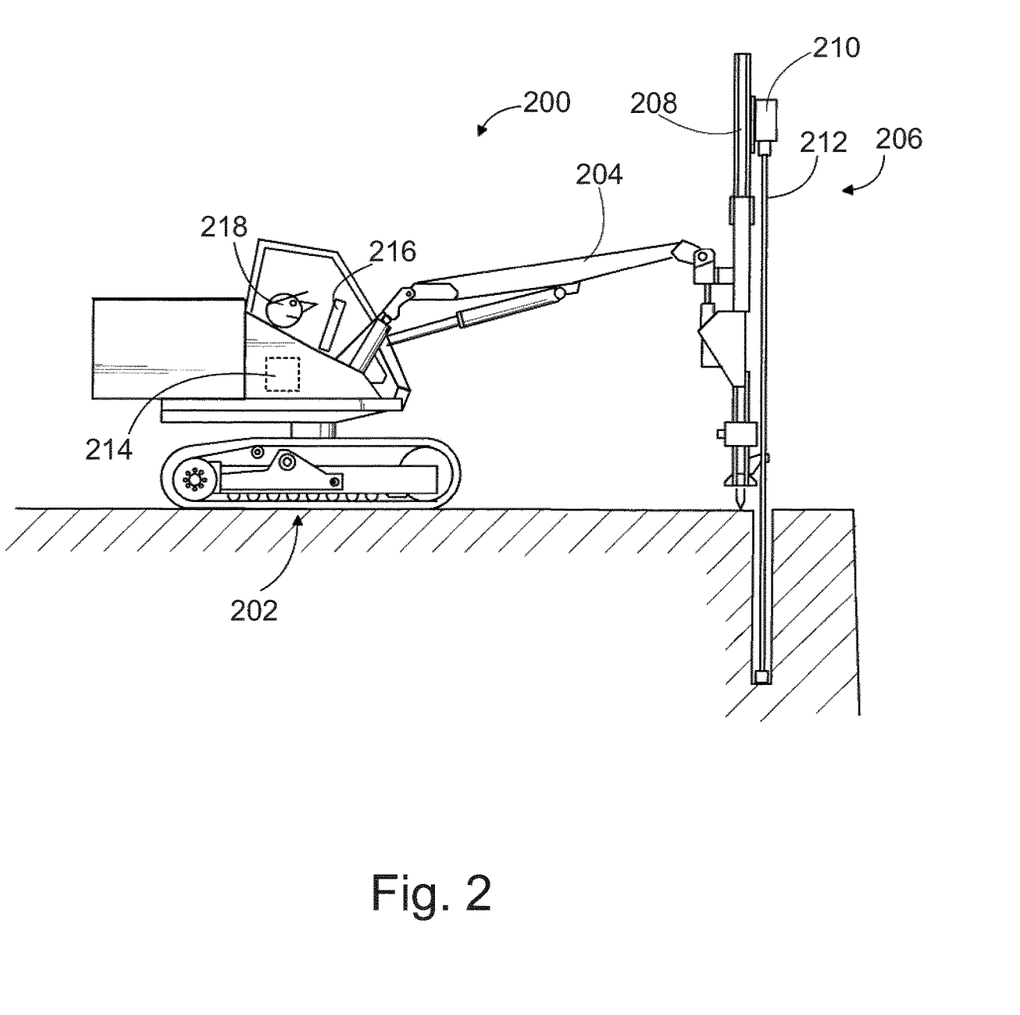
FIG. 2 shows a schematic representation of another example of a rock drilling apparatus suitable for implementing the embodiments of the invention.

While FIG. 1 shows a rock drilling apparatus typically used in underground mining operations, FIG. 2 shows an example of a rock drilling apparatus typically used in surface mining operations. FIG. 2 shows a rock drilling rig 200 comprising a movable carrier 202, one or more drilling booms 204 and drilling units 206 arranged in the drilling booms 204. The drilling unit 206 comprises a feed beam 208 on which a rock drilling machine 210 can be moved by means of a feed device. Further, the drilling unit 206 comprises a tool 212 with which the impact pulses given by a percussion device of the rock drilling machine are transmitted to the rock to be drilled. The rock drilling rig 200 further comprises at least one control unit 214 arranged to control actuators of the rock drilling rig, for example. The on-board control unit 214 may be a computer, processing device or a corresponding device, and it may comprise a user interface with a display device 216 as well as control means for giving commands and information to the control unit. The control unit may be one computer equipped with appropriate software, or an entity consisting of a plurality of computers. The operator 218 of the rock drilling rig controls the drilling interactively with the control unit 214.

The rock drilling rigs of FIGS. 1 and 2 are disclosed herein only as examples of a mining vehicle where the embodiments disclosed herein may be implemented. The embodiments are equally applicable to any other mining vehicles, such as various loading and transport equipment used in mines.

Each mining work site typically has its own production management plan comprising various kind of production management information, such as schedules, work machine allocations, drilling plans, etc. For example, a drilling pattern defining the details of the holes to be drilled is typically designed in an office or somewhere else external to the rock drilling apparatus by means of a design computer. The predesigned drilling pattern may be loaded to the control unit of the rock drilling apparatus and implemented. Alternatively, no predesigned complete drilling pattern is needed. The drilling pattern may be generated or updated during the drilling process taking into account already realized drill holes. One or more basic data elements, such as blasting technical rules and target profile data, may be defined in advance and they may be taken into consideration when creating and modifying a drilling pattern. The set data may be input to the control unit or it may be stored to one or more memory devices so that it can be retrieved by the control unit.

This production management information is continuously updated as the production at the mining work site proceeds. Therefore, the production control information of a particular mining work machine, i.e. tasks to be carried out by said mining work machine, needs to be continuously updated, e.g. on daily basis.

In principle, the production control information may be supplied to a particular mining work machine using a public communication network, such as a cellular network and a satellite telephone system. However, mining work machines are often operated in rural areas, i.e. in an environment where no cellular network connections are available. On the other hand, using a satellite telephone system for transferring significant amount of production control information is typically very expensive.

Figure 3:
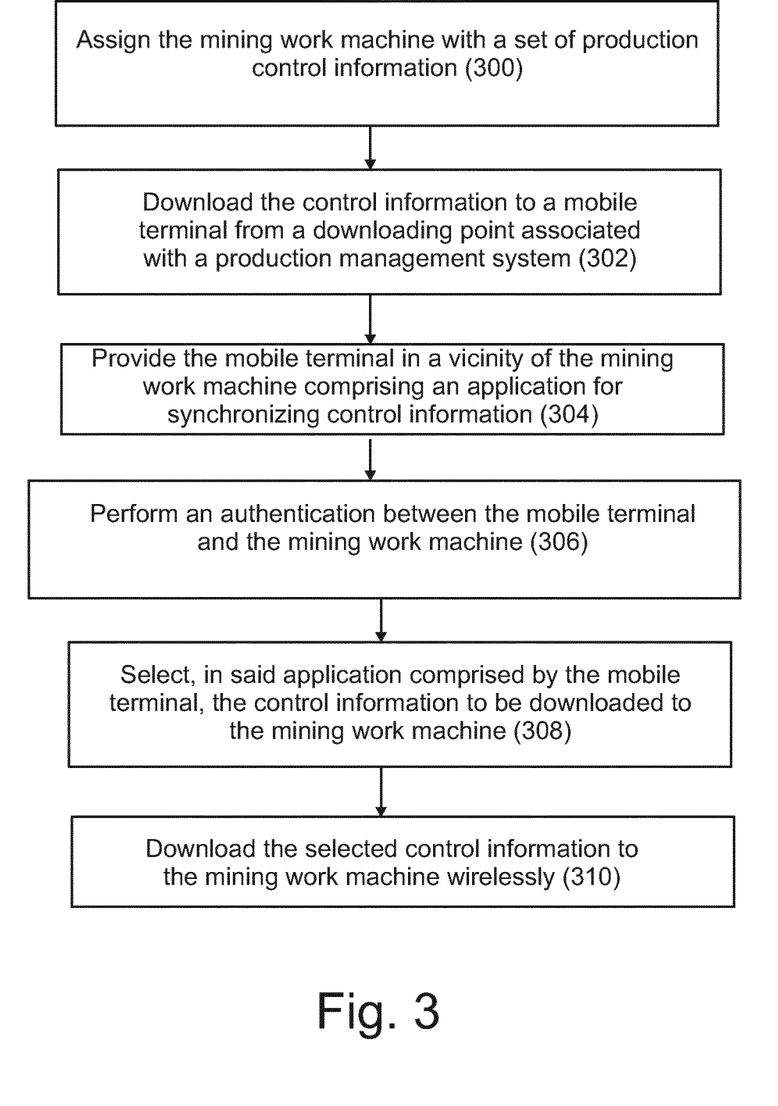
FIG. 3 shows a flow chart of a method providing a mining work machine at a work site with production control information according to an embodiment of the invention.

Now according to an aspect of the invention, the delivery of the production control information to a mining work machine is enhanced by providing a mobile terminal with a suitable application. FIG. 3 illustrates a method for providing a mining work machine at a work site with production control information.

In the method, on the basis of overall production management information of the work site, the mining work machine is assigned (300) with a set of production control information, defining tasks to be carried out by the mining work machine. The production control information is downloaded (302) to a mobile terminal from one or more downloading points associated with a production management system, wherein both the mobile terminal and the one or more downloading points comprises an application for mutually synchronizing desired production control information. The mobile terminal is then provided in a vicinity of the mining work machine (304), wherein the mining work machine comprises an application for mutually synchronizing desired production control information. The mobile terminal and the mining work machine carry out an authentication between each other (306), and the production control information to be downloaded to the mining work machine is selected (308) in said application comprised by the mobile terminal. Then the selected production control information is downloaded to the mining work machine wirelessly (310).

Thus, the method provides a convenient, inexpensive and straightforward procedure for providing a mining work machine at a work site with production control information also in a location where public communication networks are not available or at least expensive to use, such as in underground mines or mines in rural areas.

The production management information, including the production control information of a particular mining work machine, is typically managed by a production management system, which may comprise one or more computers, possibly servers, comprising appropriate production management software. The production management system can be typically accessed via a network by terminals and other computers having access rights to the production management system. Herein, the network connection may be used to provide a set of production control information from the production management system to one or more downloading points, i.e. to a node wherefrom the production control information can be downloaded to a mobile terminal.

The mobile terminal may be any kind of mobile data processing device, such as a mobile telephone, a personal digital assistant (PDA), a combination of a PDA and a mobile telephone a.k.a. a smart phone, an integrated messaging device (IMD), a desktop/laptop/notebook computer, or any other electronic device or apparatus, which is mobile when carried by an individual who is moving.

According to an embodiment, the downloading point may be a computer locating, for example, in an office, at a control station of the work site or at a home of a member of personnel. The downloading point may also be interpreted as a network node, such as a base station of wireless local area network, providing network access to a computer connected to the production management system.

Depending on the type of the downloading point, the mobile terminal may connect to the downloading point either wirelessly or via a wired connection.

For downloading the production control information, both the mobile terminal and the downloading point preferably comprise an application for mutually synchronizing desired production control information. The applications of the mobile terminal and the downloading point do not necessarily have to be same application as long as they provide means for mutually synchronizing desired production control information.

Before starting the downloading and providing the mobile terminal with access to the production control information, the downloading point preferably authenticates at least one of the mobile terminal, the application of the mobile terminal or the user of the mobile terminal.

The desired production control information may comprise a set of production control information for one or more mining work machines. The data to be downloaded may further comprise, for example, drilling plans, or control information for dividing drilling plans among a plurality of rock drilling apparatuses. For example, EP2698498 discloses a method for dividing drilling plans, wherein each rock drilling rig is provided with appropriate information on a working area inside which the rock drilling rigs have to drill the holes, as defined in the drilling plan and information on the holes inside the working area. A master unit connected to the production management system may control the whole drilling plan and may define and send rig-specific instructions, indicating at least the working area(s) defined for the respective drilling rig, to the rock drilling rigs. The master unit may be a separate computer or a server in a remote supervision site or an office and the rock drilling rigs are operating as slaves.

When the production control information and any possible related data have been downloaded to the mobile terminal, the mobile terminal is provided in a vicinity of the mining work machine. The mobile terminal may typically be a portable data processing device, and therefore it may be carried along by a human, for example a member of mining personnel. For example, an operator of a mining work machine may have the production control information downloaded to his/her mobile terminal, and in the beginning of a work shift, the operator may provide the production control information of the work shift in his/her mobile terminal in a vicinity of the mining work machine.

The mining work machine also comprises an application for mutually synchronizing desired production control information. Again, the applications of the mobile terminal and the mining work machine do not necessarily have to be same application as long as they provide means for mutually synchronizing desired production control information.

Moreover, the synchronizing applications in mining work machine and in the downloading point may differ from each other.

After providing the mobile terminal in a vicinity of the mining work machine, the mobile terminal and the mining work machine carry out an authentication between each other. At least one of the mobile terminal and the mining work machine detects the presence of the other party in the vicinity, for example by wireless signal, such as a WLAN signal, a Bluetooth signal or a NFC (Near-Field Communication) signal. The detected signal may be used as an activation signal for an authentication process, which may be carried out in a manner known, per se, in any of the plurality of WLAN, Bluetooth and/or NFC standards. As a part of the authentication process it is ensured that the mobile terminal is authorized to synchronize at least a part of the production control information stored in the mobile terminal with the mining work machine.

In response to a successful authentication, the production control information to be downloaded to the mining work machine is selected in said application comprised by the mobile terminal. Said application may comprise one or more sets of production control information for one or more mining work machines. In addition, the application may comprise further downloadable data, such as SW updates of the control platform, service and maintenance information, safety information, operator or machine specific control parameters, operations manuals, etc. Therefore, the production control information to be downloaded to the particular mining work machine is selected in the application comprised by the mobile terminal, and the selected production control information is downloaded to the mining work machine wirelessly.

Selecting the production control information may be carried out by the user of the mobile terminal or automatically by the application. The application may e.g. display all synchronizable information contained by the application on a user interface of the mobile terminal, and the user of the mobile terminal may then select the production control information to be downloaded to the mining work machine. The different sets of production control information may also be provided with identification information linking each set of production control information to particular mining work machine. Then, in response to the authentication, the application may automatically select an appropriate set of production control information for particular mining work machine.

According to an embodiment, in response to said authentication being successful, the selected control information is automatically synchronized between the mobile terminal and the mining work machine. For example, in a situation where the application of the mobile terminal comprises only one set of production control information intended to a particular mining work machine, both the applications of the mobile terminal and the mining work machine may be configured such that after a successful authentication, the set of production control information is selected and synchronized automatically to the particular mining work machine.

According to an alternative embodiment, in response to said authentication being successful, said application comprised by the mobile terminal prompts the user, whether to synchronize the selected control information between the mobile terminal and the mining work machine. Herein, even if the set of production control information is selected automatically by the application of the mobile terminal (e.g. in a situation where the application of the mobile terminal comprises only one set of production control information intended to a particular mining work machine), the synchronization is not carried out before specifically accepted by the user.

According to an embodiment, at least status information of the mining work machine is uploaded to the mobile terminal. Thus, the synchronization process may also be utilised in gathering various status information from one or more mining work machines to the mobile terminal. When the mobile terminal connects again to the production management system via a downloading point, the status information of the one or more mining work machines may be updated to the production management system, wherein a need for possible service or maintenance of the mining work machine may be evaluated.

The status information may comprise, for example, production data of the mining work machine, such as drilling hours of the machine on each working site, operating hours for the motors, number of drilled holes and other operational data, possibly associated with corresponding positional data. The status information may further comprise drilling rig condition information, service and maintenance requests, a request for drilling instruction update, and MWD (Measurement-While-Drilling) information about the drilling conditions.

According to an embodiment, a user of the mining work machine selects said status information. Thus, the users of both party (i.e. the mining work machine and the mobile terminal) may independently decide what information is involved with the synchronization process.

The control information to be downloaded may naturally vary depending on the type of the mining work machine. For example, if the mining work machine is a transportation vehicle, such as a load-and-haul dump (LHD) vehicle, the control information may comprise various kind of information for loading the excavated rock, such as the ore and waste contents, traffic control information for controlling the route of the vehicle in the mine, drive control parameters affecting automatic drive of the machine, location information of dump sites, updates of production site environment model, such as updating tunnel profile after blast, machine configuration parameters set for a shift or a task, etc.

According to an embodiment, the control information to be downloaded to the mining work machine may also comprise updates for a control platform of the mining work machine. Herein, the term "update" should be interpreted broadly, including but not limited to SW updates of the control platform, service and maintenance information, safety information, operations manuals, etc.

The above embodiments may be illustrated by an exemplified use case, where an operator of the mining work machine receives the set of production control information (e.g. the drilling plans) of the next work day to his/her home computer e.g. by email. In addition to the production control information, the operator also receives an update to the operations manual of the mining work machine. The set of production control information and the update of the operations manual are downloaded from the home computer to the operator's mobile terminal. Next day, when the operator approaches the mining work machine, the set of production control information and the update of the operations manual are automatically downloaded to the mining work machine, and e.g. the new drilling plans are immediately available for the operator. After the work shift, the quality reports of the daily drilling processes are uploaded from the mining work machine to the mobile terminal. Thus, when leaving the mining work machine, the operator carries the quality reports to a downloading point, e.g. to the home computer, in his/her mobile terminal, and the quality reports may be transmitted to the production management system for further evaluation.

A skilled person appreciates that any of the embodiments described above may be implemented as a combination with one or more of the other embodiments, unless there is explicitly or implicitly stated that certain embodiments are only alternatives to each other.

The various embodiments of the invention can be implemented with the help of computer program code that resides in a memory and causes the relevant apparatuses to carry out the invention. For example, the mining work machine may comprise circuitry and electronics for handling, receiving and transmitting data, computer program code in a memory, and a processor that, when running the computer program code, causes the machine to carry out the features of an embodiment.

Figure 4:
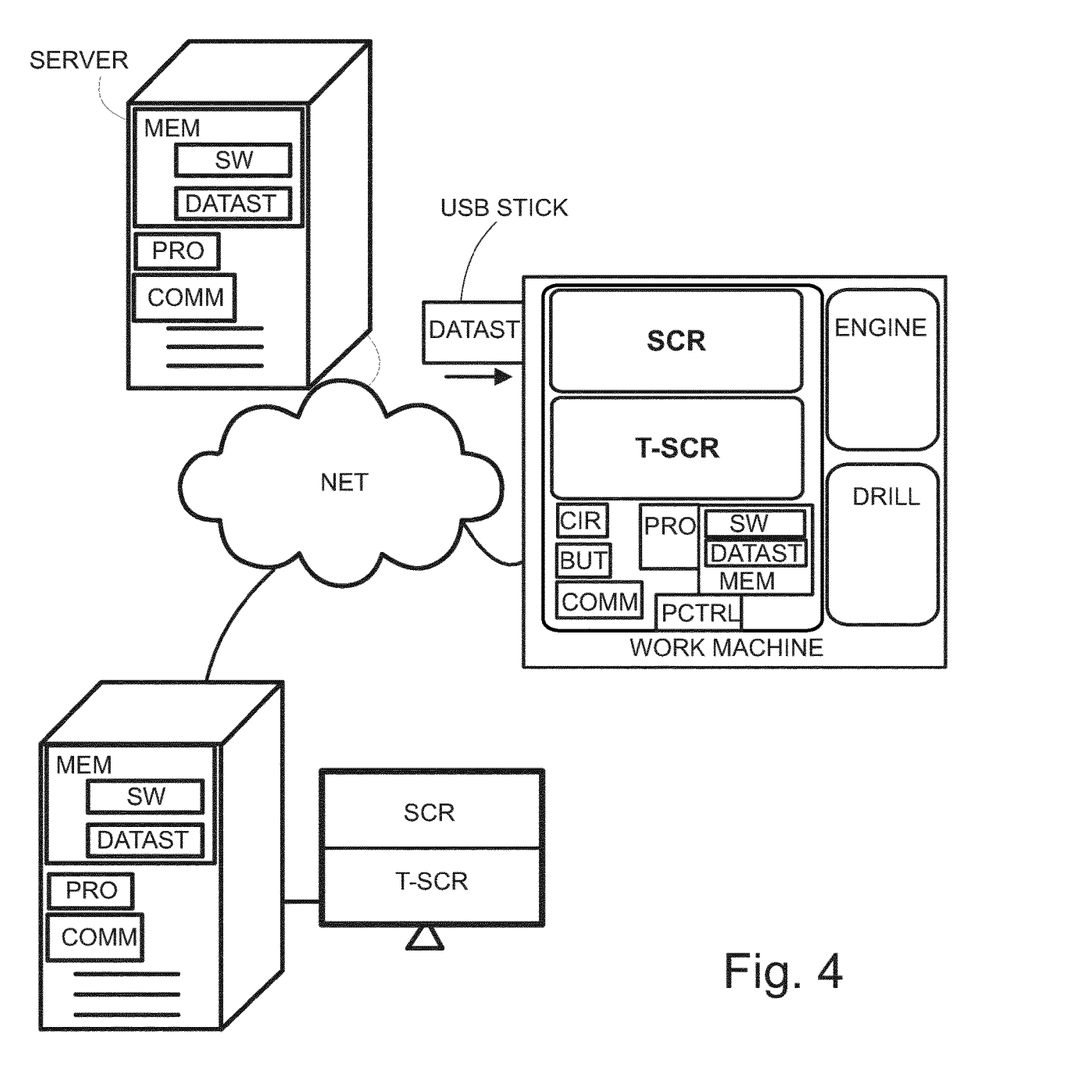
FIG. 4 shows a block diagram of a system for carrying out the control method of a work machine.

FIG. 4 shows a block diagram of a system for carrying out a control process of the work machine. The system comprises one or more processors PRO, and memory MEM. The processors and memory may be in one part of the system or distributed across different parts and different apparatuses. For example, a work machine control interface may have its own processor and/or memory, a computer connected to the work machine its own processor and memory, and other parts of the system their own. The memory MEM may comprise software SW executable on the processor PRO so that the system may display items to the operator via a screen SCR and accept input through buttons BUT, physical controls PCTRL like levers and joysticks, and/or through a touch screen T-SCR. A part or all of the steps of an embodiment may be carried out in software, and a part or all of the steps may be carried out by control circuitry CIR. The system may comprise communication modules COMM for sending and receiving data between the different parts and apparatuses of the system.

As a further aspect of the invention, there is provided computer program product, stored on a non-transitory memory medium, comprising computer program code for providing a mining work machine at a work site with production control information, the computer program code which, when executed by a processor, causes an apparatus to perform: download control information to the apparatus from one or more downloading points associated with a production management system, the mobile terminal and the one or more downloading points comprising an application for mutually synchronizing desired control information wherein control information comprises a set of production control information defining tasks to be carried out by a mining work machine; perform an authentication between the apparatus and the mining work machine in response to providing the apparatus in a vicinity of the mining work machine, the mining work machine further comprising an application for mutually synchronizing desired control information; select the control information to be downloaded to the mining apparatus; and download the selected control information to the mining work machine wirelessly.

The various embodiments of the invention may be implemented as co-functional modules in the work machine, the modules being preferably replaceable as such. The modules may be implemented as hardware, software or a combination of them.

It is obvious that the present invention is not limited solely to the above-presented embodiments, but it can be modified within the scope of the appended claims.

The invention claimed is:

1. A method for providing a mining work machine at a work site with production control information, the method comprising:
   providing a production management system including one or more computers having computer executable code when executed by the one or more computers provides the mining work machine with a set of production control information;
   providing one or more downloading points associated with the production management system via a mobile terminal;
   assigning, on a basis of overall production management information of the work site, the mining work machine with the set of production control information, defining tasks to be carried out by the mining work machine;
   performing an authentication between the mobile terminal or a user of the mobile terminal and the one or more downloading points associated with the production management system;
   downloading the assigned set of production control information to the mobile terminal from the one or more downloading points associated with the production management system, the mobile terminal and the one or more downloading points comprising an application for mutually synchronizing desired control information;
   positioning the mobile terminal in a vicinity of the mining work machine, the mining work machine including an application for mutually synchronizing desired control information;
   performing an authentication between the mobile terminal and the mining work machine;
   selecting, in said application of the mobile terminal, control information to be downloaded to the mining work machine;
   downloading the selected production control information to the mining work machine wirelessly; and
   controlling the mining work machine based on the downloaded selected production control information.

2. The method according to claim 1, wherein in response to said authentication being successful, the method further comprises synchronizing automatically the selected production control information between the mobile terminal and the mining work machine.

3. The method according to claim 1, further comprising uploading at least status information of the mining work machine to the mobile terminal; and uploading at least said status information of the mining work machine from the mobile terminal via the one or more downloading points to the production management system.

4. The method according to claim 3, wherein said status information includes positional data of the mining work machine during production and production data of the mining work machine, including drilling hours of the mining work machine on each working site, operating hours a motor of the mining work machine, and a number of drilled holes.

5. The method according to claim 1, wherein the set of production control information includes information for controlling mining operations of the mining work machine.

6. The method according to claim 5, wherein the mining work machine is a rock drilling apparatus, the set of production control information including one or more of:
   a drilling plan;

control information for dividing drilling plans among a plurality of rock drilling apparatuses;

information on a working area for the rock drilling apparatus; and information on holes located inside the working area.

7. The method according to claim 5, wherein the mining work machine is a transportation vehicle, the set of production control information including one or more of:

information for loading or dumping excavated rock;

traffic control information for controlling a route of the transportation vehicle in a mine;

location information of dump sites;

updates of a production site environment model; and machine configuration parameters set for a shift or a task.

8. The method according to claim 1, wherein the set of production control information includes updates for a control platform of the mining work machine.

9. A computer program product, stored on a non-transitory memory medium, including computer program code for providing a mining work machine with production control information from one or more downloading points associated with a production management system via a mobile terminal, the computer program code which, when executed by a processor, causes the mobile terminal to perform the steps of:

performing an authentication between the mobile terminal or a user of the mobile terminal and the one or more downloading points associated with the production management system;

downloading the production control information to the mobile terminal from one or more downloading points including an application for mutually synchronizing desired production control information;

performing, in response to positioning the mobile terminal in a vicinity of the mining work machine including the application for mutually synchronizing desired control information, an authentication between the mobile terminal and the mining work machine;

selecting the production control information to be downloaded to the mining work machine;

downloading the selected production control information to the mining work machine wirelessly; and controlling the mining work machine based on the downloaded selected production control information.

10. The computer program product according to claim 9, wherein in response to said authentication being successful, the computer program product causes the apparatus to synchronize automatically the selected production control information between the mobile terminal and the mining work machine.

11. The computer program product according to claim 9, wherein the computer program product causes the mobile terminal to further download at least status information of the mining work machine to the mobile terminal; and upload at least said status information of the mining work machine from the mobile terminal via the one or more downloading points to the production management system.

12. The computer program product according to claim 11, wherein said status information includes positional data of the mining work machine during production and production data of the mining work machine, including drilling hours of the mining work machine on each working site, operating hours for motors of the mining work machine, and a number of drilled holes.

13. The computer program product according to claim 9, wherein the production control information includes information for controlling mining operations of the mining work machine.

* * * * *